United States Patent [19]

Cherry et al.

[11] 3,710,383
[45] Jan. 9, 1973

[54] AUTOMATIC HEADWAY CONTROL SYSTEM

[75] Inventors: James R. Cherry, Barrington, Ill. 60010; Joseph W. Crow, Taylor, Mich. 48180; Robert H. Parker, Farmington, Mich. 48024

[73] Assignee: Ford Motor Company, Dearborn, Mich.

[22] Filed: Sept. 2, 1970

[21] Appl. No.: 69,023

[52] U.S. Cl. ............... 343/7 ED, 343/9, 343/112 CA
[51] Int. Cl. ............................. G01s 9/04, G01s 9/50
[58] Field of Search .................. 343/7 ED, 9, 112 CA

[56] References Cited

UNITED STATES PATENTS

2,702,342  2/1955  Korman ........................... 343/7 ED
3,442,347  5/1969  Hodgson et al. ............... 343/7 ED X
2,690,555  9/1954  Bradley .............................. 343/7 ED
3,448,822  6/1969  LaLone et al. ................. 343/7 ED X

*Primary Examiner*—Malcolm F. Hubler
*Attorney*—John R. Faulkner and Glenn S. Arendsen

[57] ABSTRACT

An electronic system coupled to a ranging device and a vehicle speed measuring device automatically controls vehicle braking and acceleration according to available vehicle headway and vehicle speed. The system provides acceleration, coasting, or braking according to the position and speed of its vehicle relative to a preceding vehicle. Significant improvements in roadway capacity and vehicle safety result from the use of the system.

12 Claims, 10 Drawing Figures

FIG. 4

AUTOMATIC HEADWAY CONTROL SYSTEM

BACKGROUND OF THE INVENTION

Vehicle safety and traffic congestion recently have become matters of primary social concern. The large network of expressways constructed in the last twenty years throughout most metropolitan areas has been unable to handle the gush of vehicle traffic imposed thereon, particularly during rush hours. Dramatic rises in construction costs and land property values have slowed additional expressway construction and it seems highly unlikely that future expressway construction will be able to keep up with demand. The appalling increase in the number and severity of highway accidents results partially from this congestion. One of the more common types of accident is the rear end collision that usually occurs because drivers tend to compromise safe vehicle headway.

A large number of systems have been proposed in recent years for preventing such accidents. Many of these systems need special equipment in both the leading car and the trailing car, and some additionally require electrical control cables embedded in the roadways. Effective implementation of such systems would require an extended time period of several years necessary to dissipate all presently existing vehicles plus extensive government legislation to force the public to purchase the systems even though initial purchasers would obtain no benefits therefrom. More sophisticated systems require special equipment in the trailing or controlled vehicle only, which of course is a more practical approach since the purchaser obtains immediate benefits. Such non-cooperative systems generally function by measuring the available headway and applying the vehicle brakes if the available headway falls below some predetermined value. These systems are capable of preventing accidents of the rear-end type but they are not capable of increasing the capacity of existing roadways.

SUMMARY OF THE INVENTION

This invention provides an automatic headway control (AHC) system that controls both the acceleration and deceleration of a vehicle as functions of vehicle speed and vehicle headway. All of the equipment required for the system is included in the controlled vehicle. The system not only actuates the vehicle brake to prevent rear end collisions but also actuates the vehicle accelerator to bring the vehicle up to a maximum speed predetermined according to available headway as limited by a speed set manually by the vehicle operator. In heavily congested urban situations, the system automatically controls vehicle speed as a function of traffic conditions and automatically maintains a safe headway distance that maximizes the capacity of the roadway. In more open highway driving of the type found on the interstate highway system, the AHC system maintains the vehicle at a speed selected by the vehicle operator unless the available headway is reduced to an endangering level. Under all conditions, the system adjusts vehicle speed smoothly for maximum passenger comfort. In addition, the system maintains driver freedom by permitting the driver to accelerate or decelerate manually at any time.

In a vehicle equipped with a braking mechanism and an accelerating mechanism, the system comprises a speed controlling device capable of maintaining a speed preselected by the vehicle driver and a ranging mechanism for determining the headway between the controlled vehicle and a leading vehicle that is less than some predetermined distance ahead of the controlled vehicle. Another mechanism determines the actual speed of the controlled vehicle and electronic circuitry determines the relative speed of the vehicles. A computer receives signals representing the speed preselected by the vehicle driver, the actual speed of the controlled vehicle, the headway, and the relative speed of a preceding vehicle, determines what action the controlled vehicle should take to maximize vehicle speed up to the preselected value without exposing it to the possibility of colliding with any preceding vehicle, and then actuates appropriate vehicle equipment to carry out that action.

The computer preferably carries out the desired action in a manner intended to maintain the comfort of the vehicle passengers. Where a small acceleration is possible, it is effected gradually. Larger acceleration is carried out more rapidly to prevent any undue delays. Decelerations take place via coasting, modulated braking or maximum braking depending on the exigencies of the traffic situation. The computer continuously monitors its input parameters and adjusts automatically to changing conditions.

A signal representing the speed selected by the vehicle driver can be memorized conveniently by a field effect transistor circuit. The driver actuates a button that charges a capacitor to a voltage representative of the desired speed. After the button is released, the high impedance of the field effect transistor permits continuous readout of the voltage for several hours without destroying its value.

Actual vehicle speed can be provided by a small alternator coupled to a vehicle wheel. Alternator output is shaped and integrated to produce a DC voltage proportional to vehicle speed.

The amount of available headway for the vehicle preferably is provided by the ranging system disclosed in copending U. S. Pat. application Scott Ser. No. 23,651 filed Mar. 30, 1970, entitled Ranging System Using Phase Detection, and assigned to the assignee of this application. That system also can be used to produce a signal representative of the rate of change of the headway as described in the Scott application, or such a signal can be generated by the computer circuitry disclosed herein. Combining the signal representing actual vehicle speed with the signal representing the rate of change of headway produces a signal representing the speed of the leading vehicle.

Computer operation usually begins by determining the speed of the leading vehicle from measured values of the speed of the controlled vehicle and the relative vehicle speed. A comparator preferably is included to determine the smaller of the desired vehicle speed or the speed of the preceding vehicle, and desired headway is determined as a function of the smaller of those speeds. The function used to compute desired headway depends on a variety of factors including vehicle braking performance; a typical value of desired headway in feet that provides safe operation for most present day vehicles equals 30 plus the numerical value of the speed in MPH. Actual headway then is compared with desired headway and the computer actuates appropriate vehicle equipment to achieve desired headway or vehicle speed.

BRIEF DESCRIPTION OF THE DRAWINGS

FIGS. 2 and 3 show the inputs to the computer.

FIGS. 8, 9 and 10 are graphic displays of the control characteristics provided by the system of this invention.

In each graph the headway distance from the controlled vehicle to the leading vehicle is plotted along the X axis. FIGS. 8 and 10 have the difference between the desired speed of the controlled vehicle and its actual speed plotted along the Y axis, while FIG. 9 has the difference in the actual speeds of the two vehicles plotted along the Y axis.

DETAILED DESCRIPTION

Figure 1:
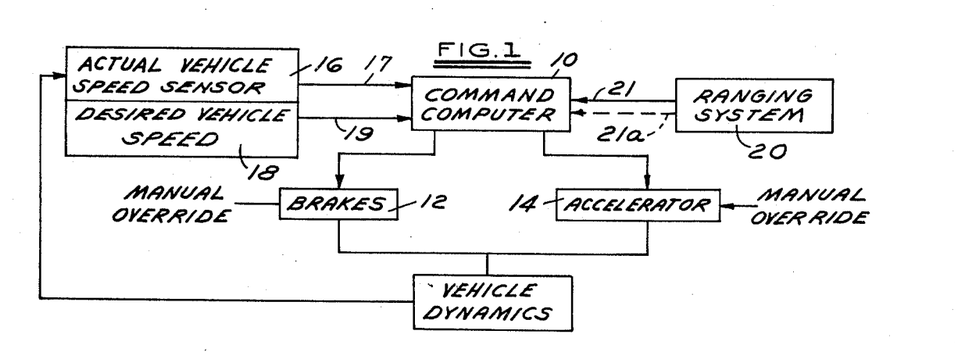
FIG. 1 is a block diagram of the system of this invention showing the relationship of the primary components.

Referring to FIG. 1, a command computer 10 serves as the heart of the system of this invention. The command computer provides the output signal to the vehicle brakes 12 and to the vehicle accelerator 14. Both the brakes 12 and the accelerator 14 can be operated manually by the vehicle driver to override the AHC system as indicated. Actuation of the brakes or the accelerator affects the vehicle dynamics and instantaneous vehicle speed is sensed constantly by a speed sensor 16 that applies a representative signal 17 to computer 10.

A second input to computer 10 is provided by a device 18 that generates a signal 19 representative of the desired vehicle speed as selected by the vehicle driver. A ranging system 20 provides a third input 21 to computer 10. Ranging system 20 typically provides a signal representing the actual available vehicle headway, which is the distance between the controlled vehicle and a preceding vehicle. A useful ranging system is disclosed in copending U.S. Pat. application Scott Ser. No. 23,651.

Figure 2:
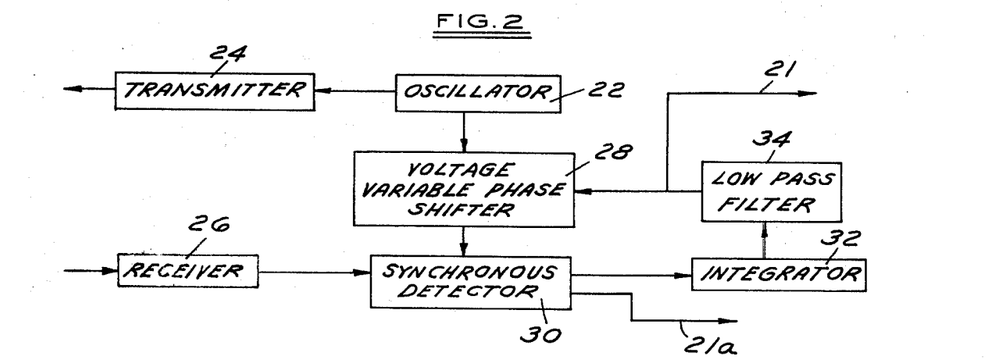
FIG. 2 is a block diagram of the ranging mechanism and FIG. 3 is a schematic diagram of circuitry that provides electrical signals representative of actual vehicle speed and desired vehicle speed.

A block diagram of the Scott ranging system is shown in FIG. 2. Briefly the ranging system comprises an oscillator 22 that applies modulation to a transmitter 24 that is located on the front of the vehicle. Transmitter 24 modulates a carrier wave and sends the modulated waveform forward of the vehicle. Reflecting waves bounced from any preceding vehicle are sensed by a detector 26 also mounted on the front of the controlled vehicle. Oscillator 22 also applies its modulation to a voltage controlled variable phase shifter 28. The outputs of detector 26 and phase shifter 28 are mixed in a synchronous detector 30. Detector 30 produces a DC voltage proportional to the distance traveled by the transmitted wave and this DC voltage is applied to an integrator 32. Integrator 32 applies the time integral of the DC voltage to the phase shifter 28 through a low-pass filter 34. The output from the filter also is applied to command computer 10 and is related directly to the range between the controlled vehicle and a preceding vehicle. An auxiliary signal 21a representative of the rate of change of the range or the relative velocity of the vehicles, is produced inherently by the Scott system at the output of detector 30 and this signal also can be applied to computer 10 if desired. The computer disclosed herein is capable of generating its own rate of change of range and thus can be used with ranging systems that do not generate that function. Additional details of construction and operation of the Scott ranging system are presented in the Scott application, the entire disclosure of which is incorporated herein by this reference.

Figure 3:
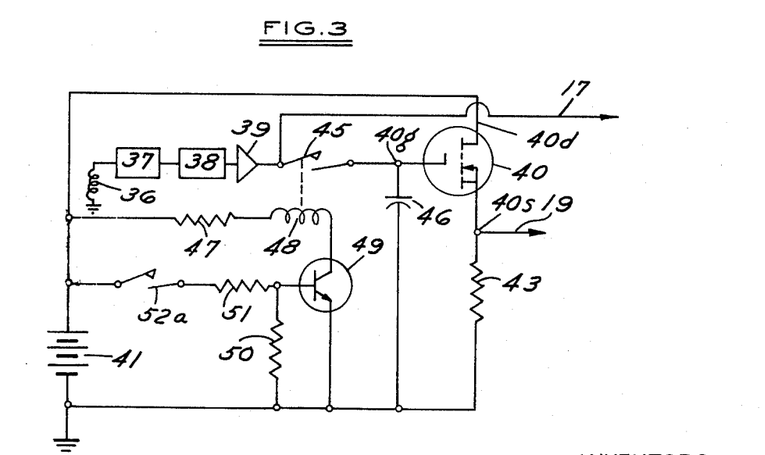

Devices capable of generating a signal representative of actual vehicle speed and desired vehicle speed are shown in FIG. 3. In FIG. 3, the output winding 36 of a small alternator driven by a vehicle wheel is connected to a clipper amplifier 37 that converts the output into a square wave of fixed amplitude. Amplifier 37 is connected to a one-shot multivibrator 38 that squares the pulses along the time axis. An integrator 39 receives the output of multivibrator 38 and produces at lead 17 a DC voltage proportional to the actual speed of the vehicle.

The circuit for generating a signal representative of desired speed comprises a field effect transistor 40 of the MOS type. Transistor 40 has its drain terminal 40d connected to the positive terminal of a vehicle battery 41 and its source terminal 40s connected through a resistor 43 to the negative terminal of battery 41. Gate terminal 40g is connected through a relay actuated switch 45 to the output terminal of integrator 39. A capacitor 46 connects gate terminal 40g to the negative battery terminal.

A resistor 47 connects the winding 48 of the relay that actuates switch 45 to the positive terminal of battery 41. The other side of winding 48 is connected to the collector terminal of a NPN type transistor 49 that has its emitter terminal connected to the negative battery terminal. A resistor 50 connects the base terminal of transistor 49 to ground and a resistor 51 in series with a manually actuated switch 52a connects the base terminal to the positive battery terminal.

When the vehicle has attained a speed that the vehicle driver wishes to maintain, the driver momentarily closes switch 52a. Transistor 49 begins conducting, which actuates the relay to close switch 45. Switch 45 applies the instantaneous voltage of integrator 39 across capacitor 46. When the driver releases switch 52a, switch 45 opens. The output voltage of integrator 39 at the time the switch was closed remains on capacitor 46 for several hours because of its high leakage resistance. Transistor 40 is connected as a source follower so that the voltage at terminal 40s is proportional to the voltage at gate terminal 40g. Lead 19 connects terminal 40s with computer 10.

Figure 4:
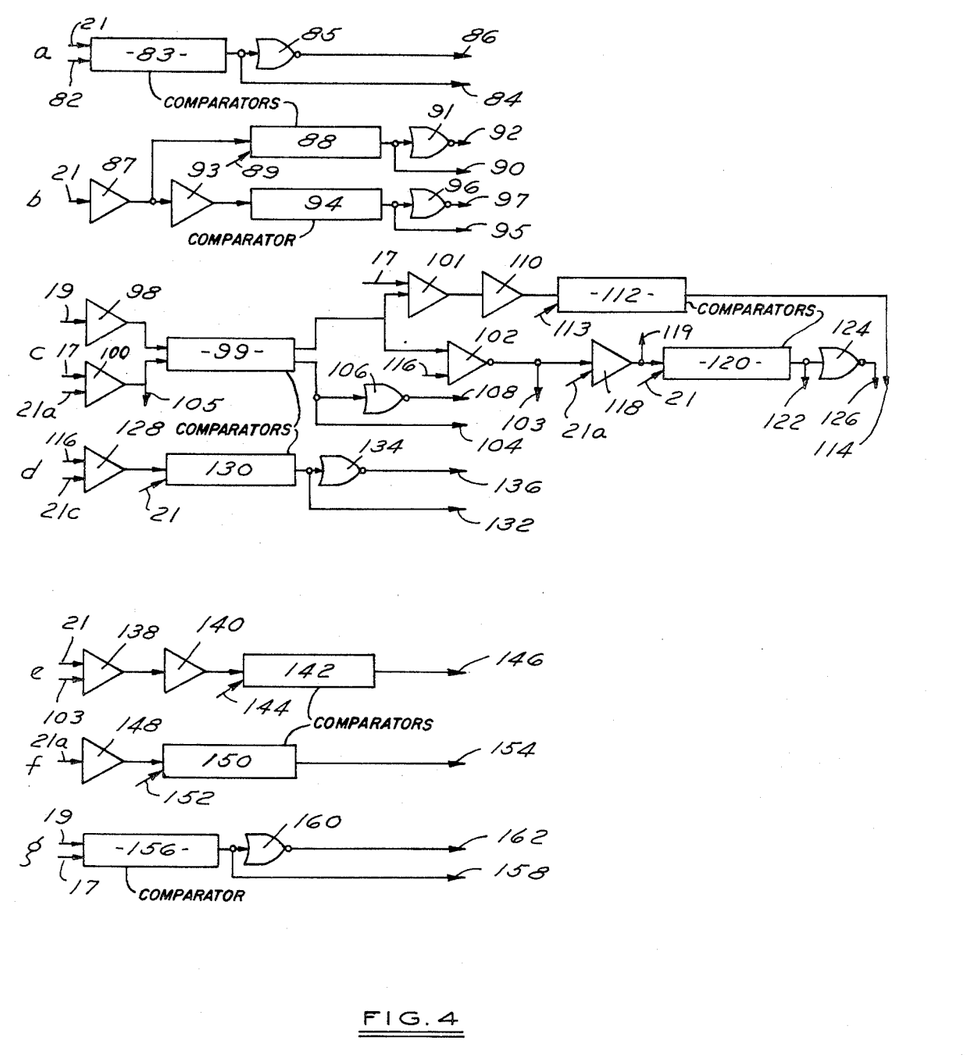
FIGS. 4 and 5 are schematics of the electronic circuitry of the computer.
Figure 5:
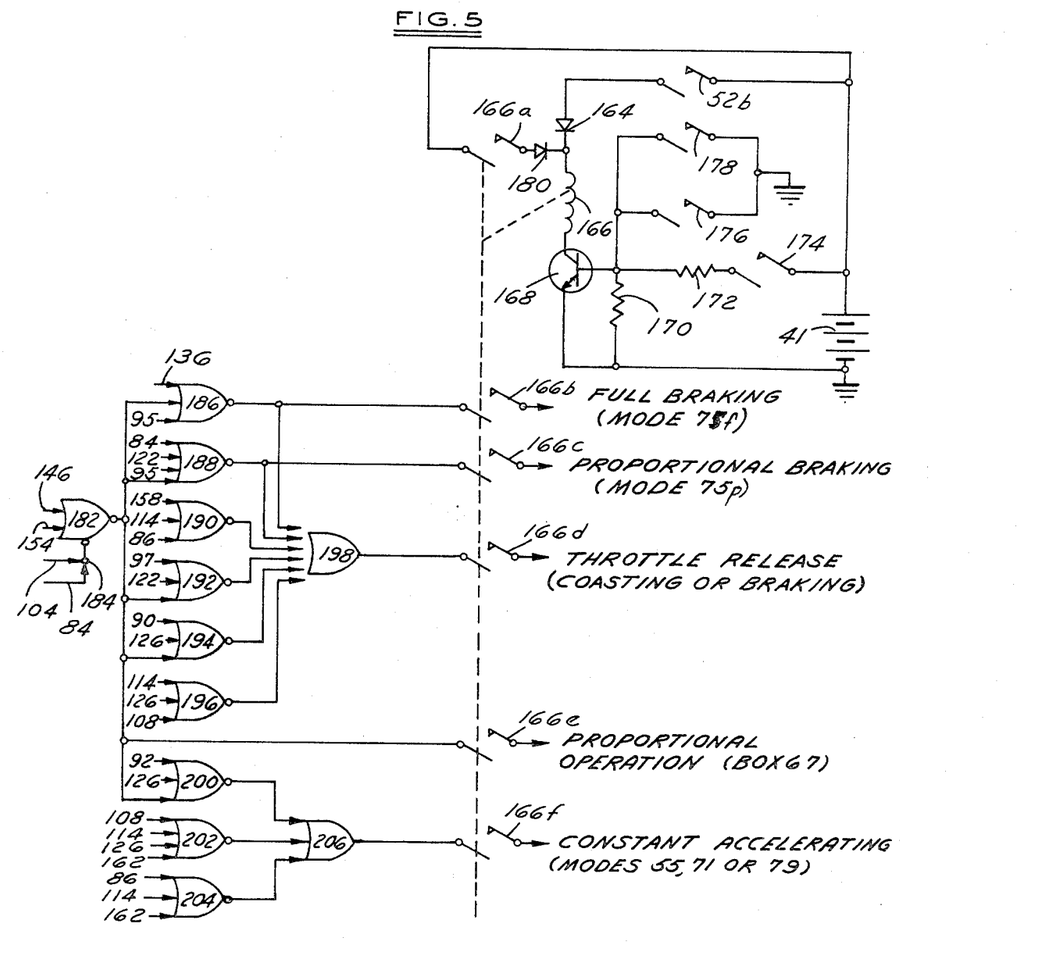

FIG. 4 displays seven subcircuits a through g of computer 10 that compute parameters needed in the computer decision circuitry of FIG. 5. FIGS. 4 and 5 can best be understood when considered against the background of the graphs of FIGS. 8–10 which show the vehicle characteristics provided by the system. The characteristics are based on emperical determinations intended to maximize safety and passenger comfort in vehicles having typical braking and acceleration abilities. Minor modifications can be made according to changes in any of these factors.

Figure 8:
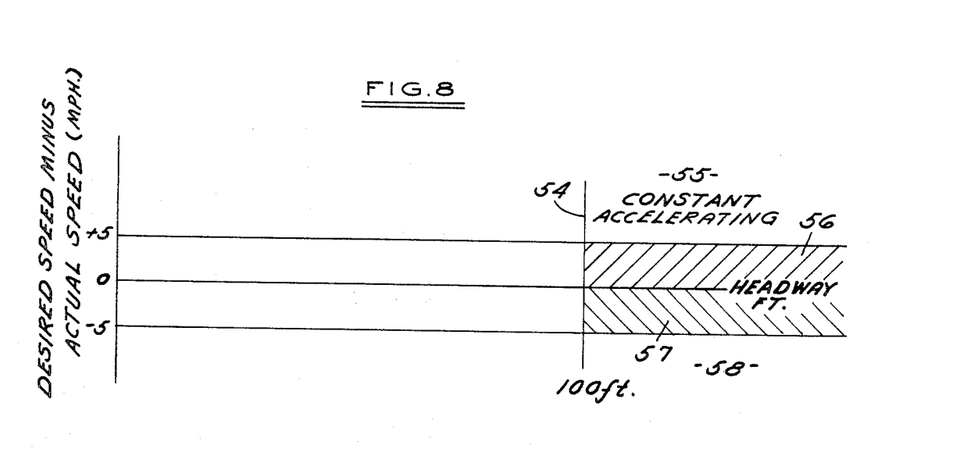
FIG. 8 shows the open road characteristics of the system.

The graph of FIG. 8 shows the open road characteristics of a vehicle controlled by the system of the invention. These characteristics occur when the ranging system does not sense the presence of a vehicle within some predetermined headway limit, typically about 100 feet. Available headway is plotted as the abscissa against the difference between desired vehicle speed and actual vehicle speed as the ordinate. The predetermined headway limit of 100 feet is represented by vertical line 54. At all actual headway distances greater than 100 feet, the system operates in one of four possible modes depending on the speed difference as follows. If desired speed exceeds actual speed by more than 5 mph, the system operates in mode 55 to accelerate the controlled vehicle at a predetermined constant rate. If desired speed exceeds actual speed by less than 5 mph, the system operates in move 56 to accelerate at a rate proportional to the speed difference. If desired speed is below actual speed by less than 5 mph, the system operates in mode 57 wherein throttle position is modulated according to the difference to produce mild vehicle deceleration. Finally, if desired speed is below actual speed by more than 5 mph, the system operates in mode 58 wherein the throttle blade is closed completely to decelerate the vehicle.

Figure 9:
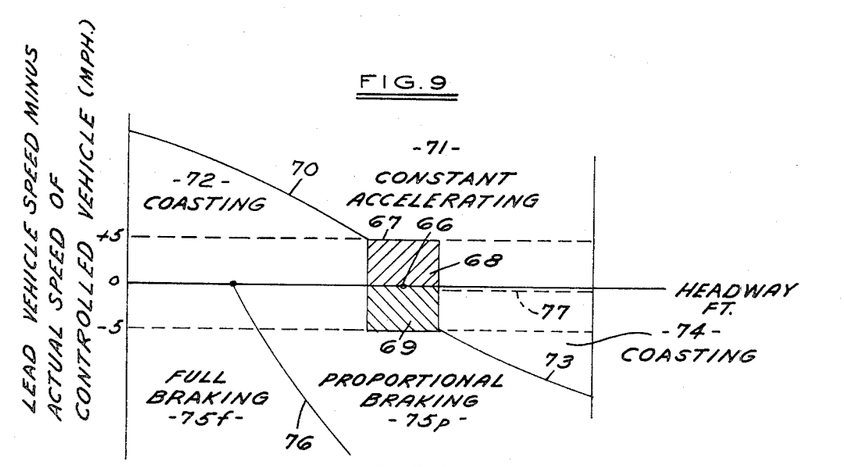
FIG. 9 shows the characteristics when the preceding vehicle is traveling slower than the desired speed of the controlled vehicle.

FIG. 9 shows the characteristics provided by the system when available headway is less than the predetermined limit and the desired speed of the controlled vehicle exceeds the speed of the preceding vehicle. When the actual speed of the controlled vehicle also exceeds the speed of the preceding vehicle, the portion of FIG. 9 below the abscissa is active. When the actual speed of the controlled vehicle is less than the speed of the preceding vehicle, the portion of FIG. 9 above the abscissa is active. In the Figure, headway is plotted as the abscissa, while the relative actual speed of the vehicles is plotted as the ordinate.

A point 66 located on the abscissa represents a computed value of desired headway based on actual vehicle speed. Point 66 is surrounded by a box 67 defining proportional regions 68 and 69 of acceleration and deceleration respectively. Vertical limits of box 67 are defined by ordinates of plus and minus 5 mph, while horizontal limits are defined by distances of desired headway plus and minus 15 feet. Point 66 and box 67 move along the abscissa depending on actual vehicle speed.

More careful control is exercised over vehicle speed within box 67 than in modes 57 and 58 of FIG. 8 because of increased safety considerations. Thus, modes 57 and 58 utilize partial or complete throttle closing to achieve deceleration, while mode 69 supplements throttle position with actual braking as necessary to achieve the desired proportional deceleration.

The area above the abscissa is divided by a computed function curve 70 into an accelerating mode 71 and a coasting mode 72. Function curve 70 is anchored permanently to the upper left corner of box 67 and thus moves with box 67 to define a family of curves having the same basic shape with different intercepts at the ordinate.

Below the abscissa, a function curve 73 extends downward and to the right of box 67 to divide that area into a coasting mode 74 and a proportional braking mode 75p. Another function curve 76 separates mode 75p from a full braking mode 75f. Curve 76 enjoys a constant position and it intersects the abscissa at a point 78 preselected on the basis of safety. Point 78 typically is about 20 feet of headway. Curve 73 is anchored permanently to the lower right corner of box 67 and moves with the box to define a family of curves in a manner similar to curve 70. A line 77 representing an ordinate of a negative one mph extends to the right of box 67. The purpose of line 77 is to insure that the controlled vehicle will reduce headway to the desired value instead of locking onto the preceding vehicle at some larger headway.

Figure 10:
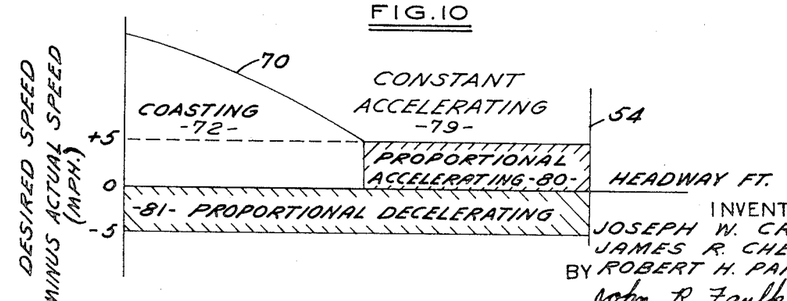
FIG. 10 shows the characteristics when the preceding vehicle is traveling faster than the desired speed of the controlled vehicle.

FIG. 10 shows characteristics provided when available headway is less than the predetermined headway limit and the desired speed of the controlled vehicle is less than the speed of the preceding vehicle. This condition occurs just after the controlled vehicle has been passed by what is now the preceding vehicle, for example. Abscissa ordinates are the same as FIG. 8. Function curve 70 of FIG. 9 is reproduced along with coasting mode 72; curve 70 separates the coasting mode from a constant accelerating mode 79 similar to mode 71 but with a lower band 80 of proportional accelerating defined by the plus 5 mph ordinate. A proportional decelerating band 81 defined by minus 5 mph extends the entire length of the abscissa to headway limit 54.

Turning now to FIG. 4, subcircuit a determines if headway is more or less than 100 feet and thus determines if the controlled vehicle will operate in FIG. 8. Terminal 21 (actual headway) and a supplemental terminal 82 having a voltage representative of 100 feet are the inputs to a comparator 83. Comparator 83 produces a positive output if the value at terminal 21 exceeds the value at terminal 82 or a negative output if the value at terminal 21 is less than the value at terminal 82. The output of the comparator appears directly at terminal 84. A NOR gate 85 reverses the sign of the output and applies it to terminal 86.

Subcircuit b computes the relative velocity of the controlled vehicle and any lead vehicle and determines several other functions. A differentiator 87 has its input terminal connected to lead 21 from the ranging system of FIG. 2. Differentiator 87 produces negative values of the rate of change of range measured by the ranging system. A comparator 88 receives the output from differentiator 87 and a signal representing one mph at terminal 89, and produces an output that is negative if the relative velocity is less than 1 mph or positive if the relative velocity is greater than 1 mph. The output of comparator 88 appears directly at a terminal 90 and is applied through a NOR gate 91 to appear with its sign reversed at an output terminal 92.

The output of differentiator 87 is applied also through a polarity inverter 93 to a comparator 94 that produces negative values if the velocity is less than zero or positive values if the velocity is greater than zero. The output of comparator 94 is applied directly to a terminal 95 and is applied through a NOR gate 96 to appear with its sign reversed at an output terminal 97. If the ranging system is capable of producing directly values of the relative velocity, differentiator 87 can be eliminated and the relative velocity applied directly to comparator 88 and inverter 93.

Subcircuit c computes the speed of any preceding vehicle, determines if that speed is greater or less than the desired speed of the controlled vehicle, computes the desired headway (the position of point 66), generates curves 70 and 73, determines if the controlled car is to the left or right of curve 70 or curve 73, and performs several other functions. An amplifier 98 has its input terminal connected to terminal 19 and applies the negative value thereof to a comparator 99. An amplifier 100 is connected to terminal 17 of FIG. 3 and terminal 21a of FIG. 2 (the output of differentiator 87 can be substituted for terminal 21a). Amplifier 100 subtracts the voltage appearing at terminal 21a from the voltage at terminal 17 and applies the negative value of the difference, which represents the velocity of the lead vehicle, to comparator 99. Comparator 99 identifies the smaller of its two inputs and applies the smaller input to adders 101 and 102. The output of comparator 99 also is applied directly to terminal 104 and through a NOR gate 106 to a terminal 108.

Adder 101 has a second input terminal connected to terminal 17 of FIG. 3 and it adds the positive voltage at terminal 17 to the negative voltage from comparator 99. This signal is the difference between the desired speed and the actual speed of the controlled vehicle. An amplifier 110 applies the absolute value of the output of adder 101 to a comparator 112. Comparator 112 determines if this absolute value is greater or less than a value representing 5 mph that is applied to terminal 113 and produces at terminal 114 a positive signal if the value is less than 5 mph or a negative signal if the value is greater than 5 mph.

Adder 102 produces the sum of the output of comparator 99 and a value applied to its input terminal 116 that represents point 78, changes the sign of the sum and applies it to a terminal 103 and a function generator 118. The value at terminal 103 represents the desired headway designated by point 66. Terminal 21a serves as a second input to function generator 118 which generates the appropriate point on curve 73. The output of function generator 118 is applied to a comparator 120 that also receives actual headway from terminal 21. Comparator 120 produces a negative output if values of the generated function are greater than values of the actual headway or a positive output if values of the generated function are less than values of the actual headway, thus determining if the controlled vehicle is in mode 74 or 75p. This output is applied directly to a terminal 122 and through a NOR gate 124 to a terminal 126.

Subcircuit d generates curve 76 and determines if the controlled vehicle should operate in area 75p or 75f. A function generator 128 receives the relative velocity from terminal 21a and a constant predetermined value representing point 78 at a terminal 116 and generates the appropriate point on curve 76. Comparator 130 compares the function with values of actual headway appearing at terminal 21 and produces a positive output if the function is greater than the actual headway or a negative output if the function is less than the actual headway. Actual values of the output of the comparator appear at terminal 132 and NOR gate 134 produces values with a reversed sign at terminal 136.

Subcircuit e defines the horizontal limits of box 67 and determines the location of the controlled vehicle relative thereto. An adder 138 adds the negative voltage appearing at terminal 103, which is the output of amplifier 102 and represents desired headway, to the positive voltage on terminal 21, which represents actual headway. An amplifier 140 produces the absolute value of the sum and applies it to a comparator 142. Comparator 142 compares the absolute value with a voltage at input 144 that represents 15 feet, the horizontal limits of box 67. Comparator output is applied to terminal 146 and is negative if the absolute value exceeds 15 feet or positive if the absolute value is greater than 15 feet.

Subcircuit f defines the vertical limits of box 67 and determines if the controlled vehicle is within the box. An amplifier 148 produces the absolute value of the relative velocity appearing at terminal 21a and applies it to a comparator 150. Comparator 150 compares the absolute value with a voltage at terminal 152 representing 5 mph. The comparator produces at output terminal 154 a negative value if the absolute value is less than 5 mph or a positive value if the absolute value exceeds 5 mph.

Terminals 17 and 19 serve as inputs to comparator 156 in subcircuit g, which determines if actual vehicle velocity differs from desired velocity. Comparator 156 produces a negative output if the value at terminal 19 exceeds the value of terminal 17 (desired velocity higher than actual velocity) or a positive output if the value at terminal 19 is less than the value at terminal 17 (desired velocity lower than actual velocity). This output is applied directly to output terminal 158 and through a NOR gate 160 that reverses its sign to output terminal 162.

FIG. 5 shows the switching circuitry that activates the control system in addition to the decision circuitry of the control system. In the switching circuitry, the vehicle battery 41 is connected through a switch 52b to the anode of a diode 164. Switch 52b is ganged to switch 52a of FIG. 3. The cathode of diode 164 is connected through a relay winding 166 to the collector of an NPN transistor 168. Transistor 168 has its emitter connected to the negative battery terminal. A resistor 170 connects the base of transistor 168 to the negative battery terminal and another resistor 172 connects the base through an on-off switch 174 to the positive battery terminal. A throttle override switch 176 in parallel with a brake override switch 178 connect the base of transistor 168 to the negative battery terminal. A switch 166a that is closed by actuation of the relay of relay winding 166 connects the positive battery terminal through a diode 180 to the cathode of diode 164. Switch 166a is ganged with five other relay actuated switches, 166b, 166c, 166d, 166e and 166f, all of which are closed by relay actuation.

The switching circuitry operates in the following manner. Switch 174 is closed by the vehicle driver to prepare the circuit for actuation. When the driver subsequently actuates switch 52b, transistor 168 begins conducting. Relay 166 closes each of switches 166a–f, with switch 166a maintaining transistor conduction after the driver releases switch 52b. Manual actuation of the vehicle throttle closes switch 176, which deactivates transistor 168 and opens switches 166a–f. Similarly, manual actuation of the vehicle brakes closes switch 178 which opens switches 166a–f.

In the decision circuitry of FIG. 5, a NOR gate 182 has two input terminals connected to terminals 146 and 154 of FIG. 4 and a third input terminal 184 connected to terminals 104 and 84. Gate 182 determines if the controlled vehicle is operating within box 67 of FIG. 9. The gate is operable only if the voltages at terminals 84, 104, 146 and 154 are low, which indicates that the desired speed of the controlled vehicle is greater than the speed of the lead vehicle and the controlled vehicle is within box 67. Gate 182 has its output terminal connected directly to switch 166e and to the input terminals of several other gates described below.

A NOR gate 186 has its inputs connected to terminal 136 from subcircuit d, terminal 95 from subcircuit b, and the output of NOR gate 182. When all three of these inputs are low or negative, gate 186 produces a high output voltage that indicates the controlled vehicle is in full braking mode 75f. The output voltage is applied to switch 166b.

A NOR gate 188 has its inputs connected to terminal 84 of subcircuit a, terminal 122 of subcircuit c, terminal 95 of subcircuit b and the output of NOR gate 182. When all of these inputs are low or negative, gate 188 produces a high output voltage that indicates the control vehicle is in proportional braking mode 75p. The output voltage of gate 188 is applied to switch 166c.

A NOR gate 190 has its inputs connected to terminal 86 of subcircuit a, terminal 114 of subcircuit c and terminal 158 of subcircuit g. When each of these inputs is low, gate 190 produces a high output that indicates the controlled vehicle is operating in mode 58 of FIG. 8.

A NOR gate 192 has its inputs connected to terminal 97 of subcircuit b, terminal 122 of subcircuit c, and the output of gate 182. When each of these inputs is low, gate 192 produces a high output that indicates the controlled vehicle is operating in mode 72 of FIG. 9.

A NOR gate 194 has its inputs connected to terminal 90 of subcircuit b, terminal 126 of subcircuit c, and the output of gate 182. When each of these inputs is low, gate 194 produces a high output voltage that indicates the controlled vehicle is in mode 74.

A NOR gate 196 has its inputs connected to terminals 108, 114 and 126 of subcircuit c. When each of these inputs is low, gate 196 produces a high output that indicates the controlled vehicle is in mode 72 of FIG. 10.

The outputs of NOR gates 186–196 serve as inputs to an OR gate 198. If any one of the inputs is high, gate 198 produces a high output that indicates either a vehicle braking or coasting mode is present and consequently the throttle should be released. The output is connected to switch 166d.

A NOR gate 200 has its inputs connected to terminal 92 of subcircuit b, terminal 126 of subcircuit c, and the output of gate 200. When each of these inputs is low, gate 200 produces a high output to indicate that the controlled vehicle is in mode 71 of FIG. 9.

A NOR gate 202 has its inputs connected to terminals 108, 114 and 126 of subcircuit c and terminal 162 of subcircuit g. When each of these inputs is low, gate 202 produces a high output that indicates the vehicle is operating in mode 79 of FIG. 10.

A NOR gate 204 has its inputs connected to terminal 86 of subcircuit a, terminal 114 of subcircuit c, and terminal 162 of subcircuit g. When each of these inputs is low, gate 204 produces a high output that indicates the controlled vehicle is operating in mode 55 of FIG. 8. The outputs of NOR gates 200, 202 and 204 are applied to an OR gate 206. When any one of its inputs is high, OR gate 206 produces a high output that indicates a constant accelerating mode is present. The output is applied to switch 166f.

Figure 6:
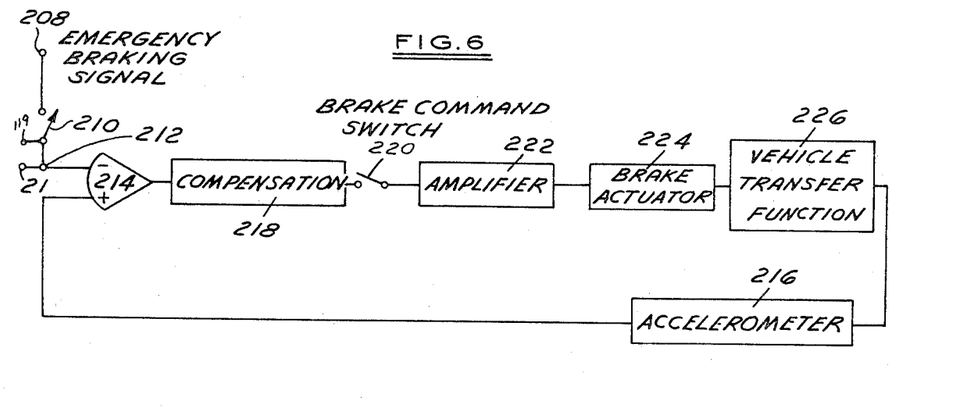
FIG. 6 is a block diagram of the braking control mechanism.

Turning now to the brake control circuit of FIG. 6, an emergency braking signal from any voltage source is applied to a terminal 208 that is connected through a normally open switch 210 to one input 212 of an error detector amplifier 214. Terminal 119, which represents the output of generator 118 of subcircuit c in FIG. 4, and terminal 21 are connected to input terminal 212 and the other input terminal of amplifier 214 is connected to a accelerometer 216 located in the controlled vehicle. A lead-lag compensation circuit 218 connects the output of amplifier 214 through a normally open switch 220 and an amplifier 222 to a brake actuating mechanism 224. A vehicle transfer function system 226 connects the brake actuating mechanism to accelerometer 216.

Switch 220 is closed whenever a high voltage appears at the right terminals of switches 166b or 166c. Switch 210 is closed when a high voltage appears at the right terminal of switch 166b. The signal at terminal 212 represents the difference between the actual headway 21 and the appropriate point on curve 73. When switch 220 is closed but switch 210 is open (the vehicle is operating in mode 75p), the signal at terminal 126 is applied through the compensating and amplifying devices to the brake actuating mechanism 224 to provide proportional braking. When full braking is commanded by a high voltage at the right side of switch 166b, the emergency braking signal applied to terminal 208 overcomes the signal at terminal 212 and is applied to the brake actuator to supply full vehicle braking.

Figure 7:
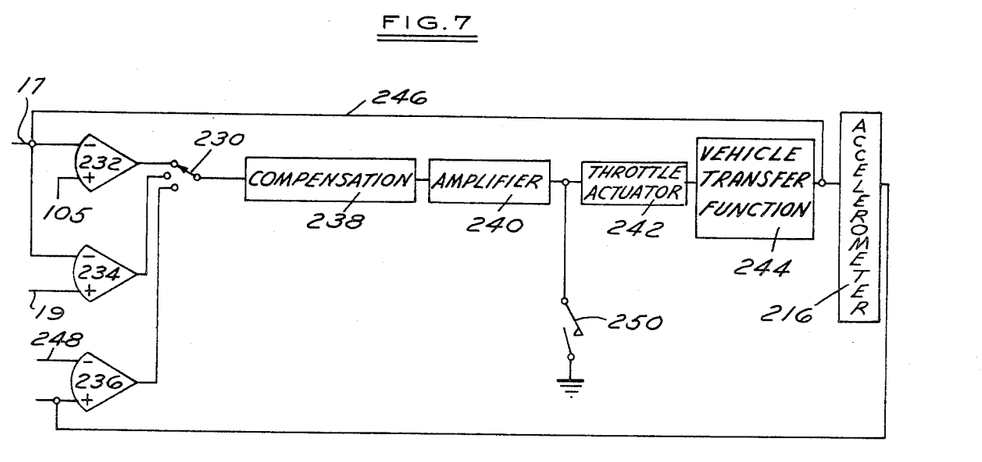
FIG. 7 is a block diagram of the throttle control mechanism.

In the throttle control system of FIG. 7, a threeway switch 230 connects one of three error detector amplifiers 232, 234 and 236 through compensating and amplifying circuitry to a throttle actuator 242. The throttle actuator 242 in turn is connected through a vehicle transfer function 244 and an accelerometer 216 to one input terminal of amplifier 236 that has its other input terminal 248 connected to a signal representing a constant acceleration rate, typically about 0.1g. A lead 246 connects the transfer function with input terminals of amplifier 232 and amplifier 234.

Terminal 17 of FIG. 3, which represents actual speed of the controlled vehicle, also is connected to lead 246. Terminal 105 of subcircuit c, which represents the actual velocity of the lead vehicle, serves as the other input to amplifier 232. Terminal 19 of FIG. 3, which represents the desired speed of the controlled vehicle, serves as the other input to amplifier 234.

Switch 230 is connected to amplifier 232 when a high voltage appears at the right of switch 166e, to amplifier 236 when a high voltage appears at the right of switch 166f, and to amplifier 234 when both of these voltages are low. When switch 230 is connected to amplifier 232, the vehicle is operating in box 67. The output of the amplifier is the difference between the speeds of the controlled vehicle and the preceding vehicle, and the FIG. 7 circuitry equalizes these speeds.

When switch 230 is connected to amplifier 236, the vehicle is operating in mode 55, 71, or 79. Amplifier 236 compares the constant acceleration value with the actual acceleration of the vehicle, and applies the difference to the throttle actuator to achieve the constant acceleration.

When switch 230 is connected to amplifier 234, the vehicle is operating in FIG. 8 or FIG. 10. The output of amplifier 234 is the difference between the desired speed and the actual speed of the controlled vehicle, and the FIG. 7 circuitry equalizes these speeds. A switch 250 releases the throttle whenever a high voltage at switches 166b or 166c signals a braking mode.

Thus this invention provides a system that continuously monitors headway and speeds to maximize vehicle safety, passenger comfort and traffic density. The system takes into account all possible traffic situation and automatically adjusts vehicle operation for changing traffic situations.

We claim:

1. An automatic headway control system for controlling a vehicle having a braking means and an accelerating means comprising
    ranging means mounted on the controlled vehicle for determining the actual headway between said vehicle and a preceding vehicle,
    speed sensing means mounted on the controlled vehicle for sensing the magnitude of its actual speed,
    speed computing means for determining the actual speed of the preceding vehicle and the smaller of the actual vehicle speeds,
    headway computing means coupled to said speed sensing means for computing the safe headway between said controlled vehicle and said preceding vehicle as a function of the smaller of the actual vehicle speeds, and
    command computing means for actuating the braking means and the accelerating means to equalize said actual headway and said safe headway.

2. The system of claim 1 in which the command computing means comprises
    speed control means for maintaining the speed of the controlled vehicle at a preselected desired value whenever actual headway exceeds a preselected maximum.

3. The system of claim 2 comprising means for determining the relative speed of the vehicles, said command computing means including means for applying maximum braking when the speed of the controlled vehicle exceeds the speed of the preceding vehicle and actual headway is less than a predetermined amount that increases with said relative speed.

4. The system of claim 3 in which the command computing means includes means for providing proportional braking when the speed of the controlled vehicle exceeds the speed of the preceding vehicle and actual headway is greater than the predetermined amount of claim 3 but less than a second predetermined amount that also increases with relative vehicle speed.

5. The system of claim 4 in which the command computing means includes means for closing the vehicle throttle when the speed of the controlled vehicle exceeds the speed of the preceding vehicle and actual headway is greater than said second predetermined amount.

6. The system of claim 5 in which the command computing means includes means for closing the vehicle throttle when the speed of the controlled vehicle is less than the speed of the preceding vehicle and actual headway is less than said safe headway.

7. The system of claim 6 in which the command computing means includes means for opening the vehicle throttle to accelerate the controlled vehicle when the speed of the controlled vehicle is less than the speed of the preceding vehicle and actual headway exceeds said safe headway.

8. The system of claim 1 comprising means for determining the relative speed of the vehicles, said command computing means including means for applying maximum braking when the speed of the controlled vehicle exceeds the speed of the preceding vehicle and actual headway is less than a predetermined amount that increases with said relative speed.

9. An automatic headway control system for controlling a vehicle having a braking means and an accelerating means comprising
    signal sending means mounted on the vehicle for projecting a signal forward of the controlled vehicle,
    signal receiving means mounted on the controlled vehicle for receiving reflections of said signal from a preceding vehicle, said signal sending means and said signal receiving means determining the actual headway between the controlled vehicle and a preceding vehicle less than a predetermined distance ahead of the controlled vehicle,
    speed sensing means mounted on the controlled vehicle for sensing the magnitude of its speed,
    brake actuating means for actuating the braking means of the controlled vehicle,
    throttle actuating means for actuating the accelerating means of the controlled vehicle,
    speed computing means for determining the actual speed of the preceding vehicle and the smaller of the actual vehicle speeds,
    headway computing means coupled to said speed sensing means for computing the safe headway between said preceding vehicle and said controlled vehicle as a function of the smaller of the actual vehicle speeds, and
    command computing means coupled to said signal sending means and said signal receiving means for controlling said brake actuating means and said accelerating means to modify the speed of the controlled vehicle so the actual headway approaches the safe headway.

10. The system of claim 9 in which the speed sensing means comprises voltage generating means for generating a voltage representative of the actual speed of the controlled vehicle, and a desired speed means for producing a voltage representative of the desired speed of the controlled vehicle, said desired speed means including a field effect transistor having its gate terminal connected by a switch to said voltage generating means for receiving said voltage and its source terminal connected to said command computing means, said field effect transistor providing an output voltage at its source terminal representative of the actual speed of the controlled vehicle when said switch was actuated momentarily.

11. The system of claim 10 comprising activating circuitry for the command computing means, said activating circuitry including switches for deactivating the command computing means upon manual actuation of the vehicle brakes or the vehicle accelerator.

12. The system of claim 11 in which the command computing means comprises means for producing a voltage representative of the difference between the speed of the preceding vehicle and the speed of the controlled vehicle when the preceding vehicle is less than a predetermined distance ahead of the controlled vehicle, and means for producing accelerating or decelerating proportional to said difference when said difference is less than about 5 mph, actual headway is within about 15 feet of the safe headway, and the desired speed of the controlled vehicle exceeds the actual speed of the preceding vehicle.

* * * * *